US012673727B2

(12) United States Patent　　(10) Patent No.: US 12,673,727 B2

Kuehner　　(45) Date of Patent: Jul. 7, 2026

(54) DIRECTIONAL VEHICLE STEERING CUES

(71) Applicant: TOYOTA RESEARCH INSTITUTE, INC., Los Altos, CA (US)

(72) Inventor: Manuel Ludwig Kuehner, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 159 days.

(21) Appl. No.: 17/382,295

(22) Filed: Jul. 21, 2021

(65) Prior Publication Data

US 2023/0026400 A1　　Jan. 26, 2023

(51) Int. Cl.
B62D 15/02 (2006.01)
B62D 6/00 (2006.01)
B60W 50/14 (2020.01)

(52) U.S. Cl.
CPC ........... B62D 15/029 (2013.01); B62D 6/007 (2013.01); B62D 15/0265 (2013.01); *B60W 50/14* (2013.01); *B62D 6/008* (2013.01)

(58) Field of Classification Search
CPC .... B62D 15/029; B62D 15/021; B62D 6/008; B62D 15/025; B62D 15/0215;
(Continued)

(56) References Cited

U.S. PATENT DOCUMENTS

2006/0217861 A1　　9/2006　Ihara
2009/0014227 A1 *　1/2009　Bolourchi ............ B62D 15/026
180/204

(Continued)

FOREIGN PATENT DOCUMENTS

DE　　102005036219　　2/2007
DE　　102018107340　　10/2018
(Continued)

OTHER PUBLICATIONS

Jensen et al., "A customizable automotive steering system with a haptic feedback control strategy for obstacle avoidance notification," IEEE Transactions on Vehicular Technology, Nov. 2011, pp. 4208-4216.

(Continued)

*Primary Examiner* — Khoi H Tran
*Assistant Examiner* — Tanner L Cullen
(74) *Attorney, Agent, or Firm* — SHEPPARD, MULLIN, RICHTER & HAMPTON LLP; Daniel N. Yannuzzi

(57)　　　　ABSTRACT

Directional vehicle steering cues are presented to a vehicle operator to suggest a particular steering direction (e.g., left vs. right) or to warn the operator of the directionality of an impending hazard. A directional vehicle steering cue may include one or more changes in steering angle that convey an associated directionality. A directional steering cue can include a first vibration pattern that includes a change in steering angle in a first direction to represent, for example, a suggested right turn, followed by a second vibration pattern that includes a change in steering angle in a second direction opposite to the first direction. The angular rate of change of the steering angle in the first direction may be larger than the angular rate of change of the steering angle in the second direction such that the first vibration pattern is more perceptible to a vehicle operator than the second vibration pattern.

17 Claims, 7 Drawing Sheets

(58) Field of Classification Search
  CPC ...... B60W 50/16; B60W 30/12; B60W 50/14;
        B60W 2050/143; B60W 40/072; G08G
        1/167; B60T 2201/082; B60T 2201/087
  See application file for complete search history.

(56) References Cited

U.S. PATENT DOCUMENTS

| | | | | |
|---|---|---|---|---|
| 2010/0121532 A1* | 5/2010 | Urai | .................... | B62D 15/0265 |
| | | | | 701/42 |
| 2013/0021144 A1* | 1/2013 | Hamachi | ................ | B62D 1/046 |
| | | | | 340/425.5 |
| 2013/0127610 A1* | 5/2013 | Sanma | ..................... | B62D 1/06 |
| | | | | 340/438 |
| 2014/0002251 A1 | 1/2014 | Springer | | |
| 2014/0172235 A1* | 6/2014 | Werling | ................ | B60W 30/12 |
| | | | | 701/41 |
| 2017/0274931 A1* | 9/2017 | Yang | .................... | B62D 15/029 |
| 2017/0313308 A1* | 11/2017 | Tseng | .................... | B60W 30/09 |
| 2018/0015919 A1* | 1/2018 | Hanzawa | ............. | B60W 50/14 |
| 2018/0257700 A1* | 9/2018 | Ishikawa | ............. | B62D 5/0472 |
| 2018/0281855 A1* | 10/2018 | Talamonti | ............. | G02B 27/01 |
| 2019/0193754 A1 | 6/2019 | Augst | | |
| 2019/0315375 A1* | 10/2019 | Li | ....................... | G01C 21/3652 |
| 2020/0356173 A1 | 11/2020 | Bajaj | | |
| 2022/0281473 A1* | 9/2022 | LaBarbera | ........... | B62D 15/025 |

FOREIGN PATENT DOCUMENTS

| | | | | | |
|---|---|---|---|---|---|
| JP | 2004256067 A | * | 9/2004 | .............. | B62D 6/00 |
| JP | 5544422 | | 7/2014 | | |
| KR | 20060066477 A | * | 6/2006 | .............. | B62D 7/22 |
| KR | 20140080871 | | 7/2014 | | |

OTHER PUBLICATIONS

Shakeri et al., "Evaluation of Haptic Patterns on a Steering Wheel" In: 8th International Conference on Automotive User Interfaces and Interactive Vehicular Applications, Ann Arbor, MI, USA, Oct. 24-26, 2016, pp. 129-136. ISBN 9781450345330 (doi:10.1145/3003715.3005417).

Steele et al., "Shared control between human and machine: using a haptic steering wheel to aid in land vehicle guidance," Proceedings of the human factors and ergonomics society annual meeting, pp. 1671-1675, 2001.

Tappeiner et al., "Good Vibrations: Asymmetric Vibrations for Directional Haptic Cues," World haptics 2009, pp. 285-289.

Yan et al., "Intention-Based Lane Changing and Lane Keeping Haptic Guidance Steering System," in IEEE Transactions on Intelligent Vehicles, 2020, pp. 1-12.

\* cited by examiner

500

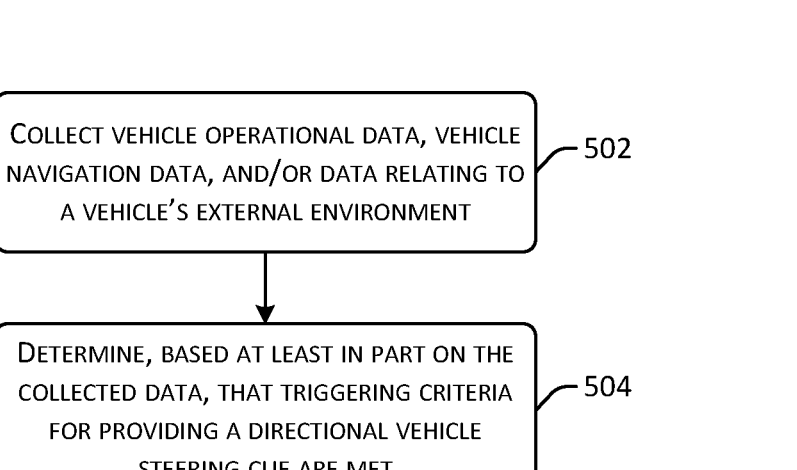

COLLECT VEHICLE OPERATIONAL DATA, VEHICLE NAVIGATION DATA, AND/OR DATA RELATING TO A VEHICLE'S EXTERNAL ENVIRONMENT — 502

DETERMINE, BASED AT LEAST IN PART ON THE COLLECTED DATA, THAT TRIGGERING CRITERIA FOR PROVIDING A DIRECTIONAL VEHICLE STEERING CUE ARE MET — 504

CAUSE A FIRST VIBRATION PATTERN TO BE APPLIED TO A VEHICLE STEERING WHEEL IN A FIRST DIRECTION AT A FIRST ANGULAR RATE OF CHANGE — 506

CAUSE A SECOND VIBRATION PATTERN TO BE APPLIED TO THE STEERING WHEEL IN A SECOND DIRECTION OPPOSING THE FIRST DIRECTION AT A SECOND ANGULAR RATE OF CHANGE DIFFERENT FROM THE FIRST ANGULAR RATE OF CHANGE — 508

FIG. 5

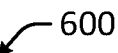
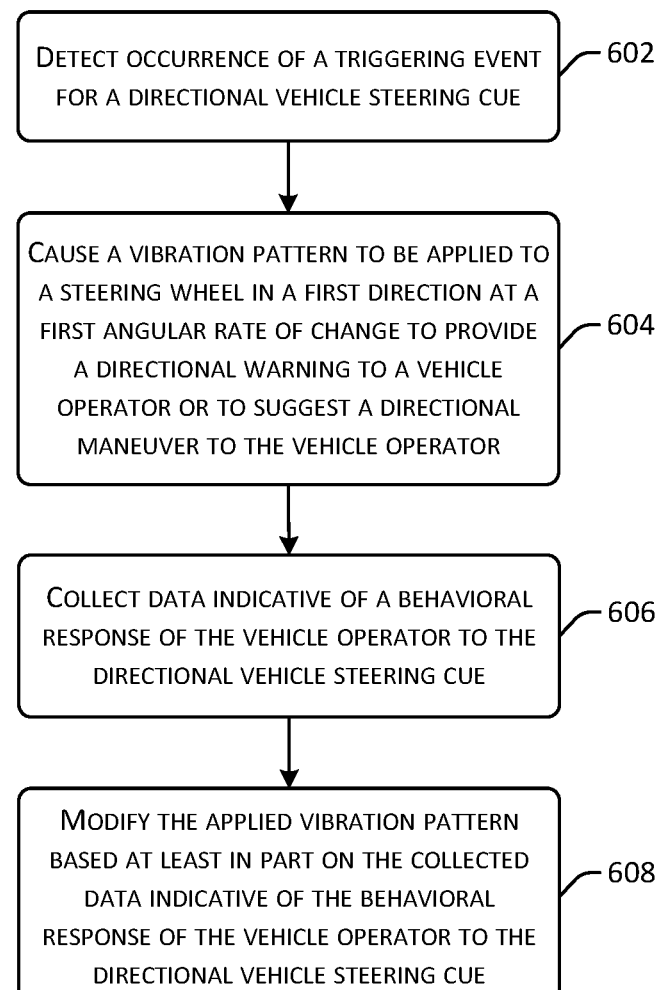
FIG. 6

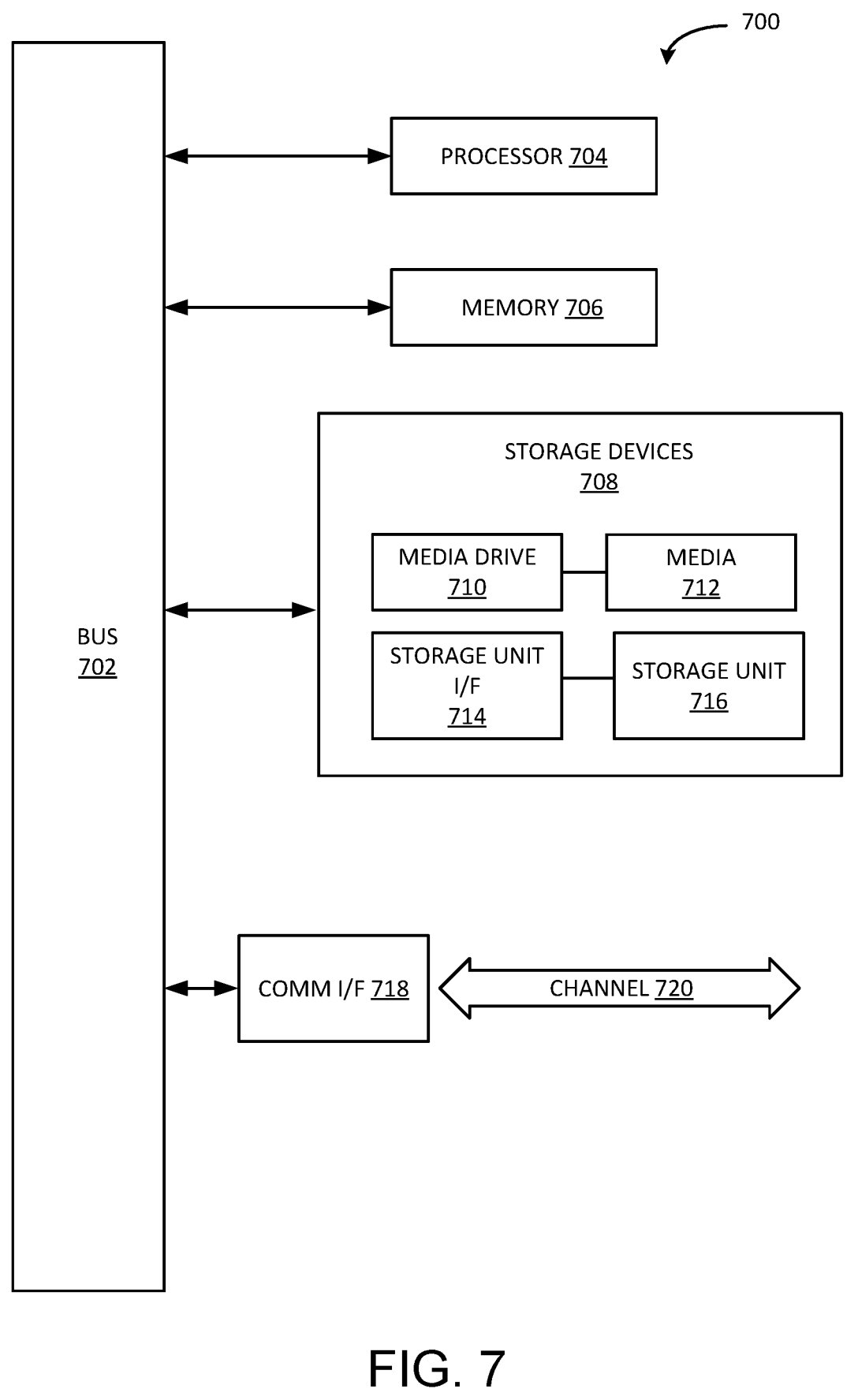

700

BUS
702

PROCESSOR 704

MEMORY 706

STORAGE DEVICES
708

MEDIA DRIVE
710

MEDIA
712

STORAGE UNIT
I/F
714

STORAGE UNIT
716

COMM I/F 718

CHANNEL 720

FIG. 7

DIRECTIONAL VEHICLE STEERING CUES

TECHNICAL FIELD

The disclosed technology relates generally to haptic output provided to a vehicle operator via a vehicle's steering mechanism, and more particularly, in some embodiments, to directional steering cues provided to a vehicle operator via the application of vibration patterns to a steering wheel.

DESCRIPTION OF RELATED ART

There exist various vehicle safety systems designed to increase a situational awareness of a vehicle operator. Situational awareness of a vehicle operator may refer to the operator's level of alertness or attentiveness during vehicle operation, and in particular, the extent to which the operator is aware of objects, events, hazards, or the like inside and/or external to the vehicle, at least some of which, may pose a potential safety risk. Such vehicle systems generally utilize audible and/or visual cues to enhance the vehicle operator's situational awareness. Some vehicle systems are capable of providing haptic feedback to the user by vibrating a steering wheel when the vehicle has crossed over a lane boundary.

These existing cues, however, suffer from a number of technical drawbacks. For instance, in various types of vehicle events and vehicle operating scenarios, existing cues for enhancing a vehicle operator's situational awareness are insufficient for warning the vehicle operator of an impending hazard in such a way that a desired behavior/response is elicited from the vehicle operator, or are otherwise incapable of inducing such a desired behavior/response, and thus, fail to improve vehicle safety.

BRIEF SUMMARY OF THE DISCLOSURE

According to various embodiments of the disclosed technology, systems, methods, computer-readable media, techniques, and algorithms are disclosed for providing directional steering cues to a vehicle operator via the application of steering vibration patterns to suggest/recommend a particular steering direction (e.g., left vs. right) and/or to warn the operator of the directionality of an impending hazard. In particular, a directional vehicle steering cue may include one or more vibration patterns applied to a steering wheel of the vehicle that convey a directionality associated with an impending hazard or a directionality of a suggested/recommended vehicle maneuver.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 5 is a flowchart of an illustrative method for providing directional vehicle cues to a vehicle operator via the application of particular vibration patterns to a vehicle's steering mechanism in accordance with example embodiments of the disclosed technology.

FIG. 6 is a flowchart of an illustrative method for modifying a directional steering cue based on data indicative of a vehicle operator's behavioral response to the directional steering cue in accordance with example embodiments of the disclosed technology.

FIG. 7 is an example computing component that may be used to implement various features of embodiments of disclosed technology of the disclosed technology.

Figure 1:
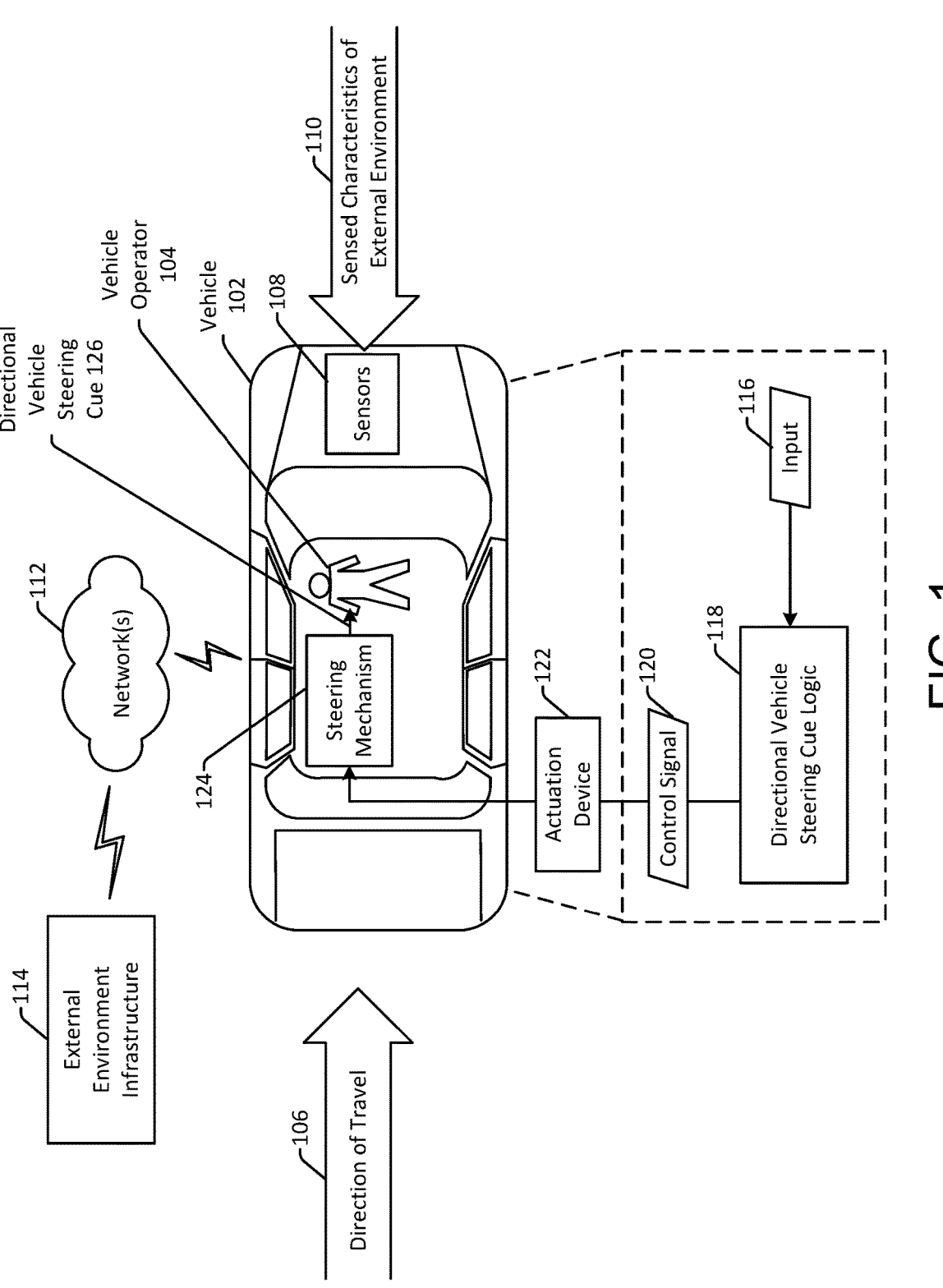
FIG. 1 is a schematic illustration of the triggering and presentation of directional vehicle steering cues to a vehicle operator in accordance with example embodiments of the disclosed technology.

The figures are not exhaustive and do not limit the present disclosure to the precise form disclosed.

DETAILED DESCRIPTION

Example embodiments of the disclosed technology relate to, among other things, systems, methods, computer-readable media, techniques, and algorithms for providing directional vehicle steering cues to a vehicle operator to suggest/recommend a particular steering direction (e.g., left vs. right) and/or to warn the operator of the directionality of an impending hazard. More specifically, a directional vehicle steering cue may include one or more vibration patterns applied to a steering wheel of the vehicle that convey a directionality associated with an impending hazard or a directionality of a suggested/recommended vehicle maneuver.

In some embodiments, the directional vehicle steering cue includes a first vibration pattern applied to a vehicle's steering mechanism (e.g., steering wheel) over a first period of time. The first vibration pattern may include a change in a steering angle of the steering wheel in a particular direction (e.g., positive or negative). More specifically, in some embodiments, application of the first vibration pattern may include application of a torque to a steering wheel in a particular direction (e.g., clockwise or counterclockwise), which in turn, results in a change in the steering angle in a corresponding direction. For the purposes of establishing a convention, a clockwise rotation of the steering wheel is assumed to correspond to a positive steering angle and a counterclockwise rotation of the steering wheel is assumed to correspond to a negative steering angle. It should be appreciated that while embodiments are described herein using a steering wheel as an example steering mechanism, other steering mechanisms are also contemplated including, without limitation, a joystick-based steering control, such as in a drive-by-wire system. Further, a steering wheel or other steering control may have any suitable shape such as a yoke-style steering shape, for example.

In example embodiments, the torque applied to the steering wheel as part of a steering wheel vibration pattern is not sufficient to generate a yaw moment for the vehicle. That is, the torque—while perceptible to the vehicle operator—may not be sufficient to influence the actual trajectory of the vehicle. In some embodiments, a directional vehicle steering cue includes a first vibration pattern applied in a first direction such as a change in steering angle in the positive direction to indicate a suggested "turn right" maneuver and a second vibration pattern applied in a second direction opposing the first direction. An angular rate of change (also referred to herein as angular velocity) of the steering angle for the first vibration pattern may be greater than an angular rate of change of the steering angle for the second vibration pattern. In some embodiments, the angular rate of change of the first vibration pattern and/or the angular rate of change of the second vibration pattern is constant, while in other embodiments, one or both of the angular rates of change are not constant, i.e., the steering angle may be changed non-linearly.

In some embodiments, a magnitude of a change in the steering angle associated with the first vibration pattern may be substantially the same or identical to the magnitude of the change in the steering angle associated with the second vibration pattern, in which case, the first vibration pattern may achieve the desired change in steering angle in a shorter duration of time than the second vibration pattern, thereby resulting in the asymmetry between the angular rates of change of the first and second vibration patterns. Further, in some embodiments, the average of positive steering angle changes and negative steering angle changes applied over time is zero. That is, when considered over some defined lookback window, the average steering angle change for vibration patterns corresponding to left directional vehicle steering cues and vibration patterns corresponding to right directional vehicle steering cues may be zero. This results in a net zero change from the initial set point of the steering wheel and contributes to ensuring that the vibration patterns applied as part of the directional steering cues do not actually influence vehicle trajectory.

As previously noted, a directional vehicle steering cue may be presented to a vehicle operator to suggest/recommend a vehicle turning maneuver in a particular direction. For instance, vehicle navigation data may indicate that the vehicle is approaching a right turn along the navigation route. A directional vehicle steering cue (e.g., a positive steering angle change with a relatively steep angular velocity) may be presented to remind/encourage/suggest/recommend that the vehicle operator make the desired right turn. In some embodiments, a directional vehicle steering cue may be presented responsive to occurrence of a triggering event/satisfaction of triggering criteria.

For instance, a triggering event may include a vehicle being within a threshold distance of a location along a navigation route at which a vehicle turning maneuver is needed. As another non-limiting example, after determining that the vehicle is within a threshold distance of a particular location at which a turning maneuver is required, the triggering criteria may further evaluate whether the vehicle operator has initiated the needed turning maneuver. In some embodiments, criteria for establishing that the turning maneuver has been initiated includes whether the vehicle has experienced at least a threshold amount of deceleration over a preceding time window and/or whether a steering angle of the vehicle has changed in the same direction as the needed turning maneuver by at least a threshold amount. Thus, in some embodiments, if criteria such as these are not met and the vehicle is within a threshold distance of a turning location, a directional vehicle steering cue may be provided to elicit a desired behavioral response from the vehicle operator—initiation of the required turning maneuver. In some embodiments, detection of a triggering event may be tied to the vehicle's speed. For instance, a triggering event may be detected if: 1) it is determined that the vehicle, based on its instantaneous velocity/acceleration and/or average velocity/acceleration, will reach, within a threshold period of time, the location at which a turning maneuver is required, and 2) the vehicle operator has not yet initiated the turning maneuver.

A directional steering cue may be presented to the vehicle operator prior to the vehicle reaching the turning location to allow the vehicle operator sufficient time to perceive the directional cue and initiate the turning maneuver at the appropriate moment. In some embodiments, the vehicle may be traveling at such a fast speed that a safety risk would be presented if the vehicle operator were to initiate a turning maneuver responsive to a directional steering cue. In such scenarios, a vehicle control circuit may refrain from presenting the directional steering cue, and may instead allow the vehicle to pass the turning location without the turning maneuver being initiated, and may subsequently re-route the vehicle's navigation path accordingly.

In some embodiments, one or more characteristics of a vibration pattern applied to a steering wheel as part of a directional steering cue may indicate the type of vehicle maneuver that is being suggested/recommended. For instance, a vibration pattern that involves a linear change in the steering angle may be used to indicate a standard turning maneuver (e.g., a left or right turn depending on the direction in which the steering angle is changed), while a vibration pattern that involves a non-linear change in the steering angle may be used to indicate a U-turn.

In some embodiments, a directional vehicle steering cue may be a warning that indicates a directionality of a potential safety threat. For instance, a directional steering cue may include a steering angle change in the negative direction with a relatively steep angular rate of change that indicates a possible collision on the left (driver's) side of the vehicle due to a lane change maneuver initiated by the vehicle operator. Upon haptically perceiving this directional steering cue as a warning of a potential safety hazard in a particular direction, the vehicle operator is more likely to instinctually provide the appropriate behavioral response—application of a torque to the steering wheel in the opposing direction as the directional steering cue in order to mitigate the safety risk posed. It should be appreciated that, in some embodiments, in order to ensure consistency of muscle memory for the vehicle operator, a vehicle control circuit may be implemented to provide one or the other of directional steering cue warnings or directional steering cue suggestions, but not both. In other embodiments, a vehicle control circuit may be configured to implement both directional steering cue warnings and directional steering cue suggestions, and a vehicle operator may be provided with the capability to toggle between the two modes.

In some embodiments, a magnitude of the angular rate of change in steering angle associated with a vibration pattern indicates a desired intensity or speed of a corresponding vehicle maneuver elicited by the vibration pattern. For instance, the larger the angular rate of change associated with a steering wheel vibration pattern representing a directional steering cue, the more rapidly a turning maneuver is expected to be initiated and performed by the vehicle operator in response to the directional steering cue. As another non-limiting example, the larger the angular rate of change associated with the vibration pattern, the greater the amount of torque the vehicle operator is expected to apply to the steering wheel to initiate and perform the turning maneuver suggested by the vibration pattern.

In some embodiments, a first directional steering cue may be presented to a vehicle operator responsive to detection of a first triggering event. The first directional vehicle steering cue may include a first vibration pattern applied to the steering wheel in a first direction at a first angular velocity. In some embodiments, a second triggering event may be detected. The second triggering event may indicate a greater urgency for a desired vehicle maneuver or a greater safety risk than the first triggering event, in which case, a directional vehicle steering cue presented responsive to the second triggering event may include a vibration pattern that is applied to the steering wheel in the first direction at a third angular rate of change that is greater than the first angular rate of change. Thus, triggering events that indicate heightened urgency for a desired vehicle maneuver (e.g., an urgent turning maneuver that needs to be made to stay on a specified navigation route) or an otherwise heightened level of risk may trigger directional steering cues with vibration patterns that involve larger angular rates of change in the steering angle. Further, in some embodiments, the magnitude of a change in steering angle associated with a vibration pattern may be directly related to the speed/intensity of the desired vehicle maneuver that the vibration pattern intends to elicit from the vehicle operator.

Various technical features and aspects of embodiments of the disclosed technology yield technical solutions to technical problems associated with conventional vehicle safety systems/features. In particular, while conventional vehicle safety systems are capable of providing vibrational feedback to a driver through a steering wheel to generally warn the driver of a specific safety risk (e.g., crossing over a lane boundary), they do not provide vibrational feedback that constitutes a directional cue. That is, conventional vehicle safety systems do not provide haptic steering wheel feedback in the form of a vibration pattern(s) that indicates a particular directionality such as a directionality of a suggested vehicle maneuver (e.g., a left or right turn) or a directionality of an impending safety hazard (e.g., an impending collision with another vehicle or other object). This technical problem is solved by embodiments of the disclosed technology which present directional vehicle steering cues to a vehicle operator in the form of steering wheel vibration pattern(s) that include directional steering angle changes at one or more angular rates of change. In some embodiments, the direction of the steering angle change in conjunction with the angular rate of change in the steering angle conveys the directionality of a suggested vehicle maneuver or the directionality of a warning of a safety hazard in the vehicle's environment.

Example embodiments of the disclosed technology also provide technical solutions to various other technical problems associated with conventional vehicle safety systems. For example, some embodiments of the disclosed technology generate and present directional vehicle steering cues such that an average of positive steering angle changes and negative steering angle changes associated with directional steering cues applied to a steering wheel over a designated lookback window is zero. In this manner, an initial setpoint of the steering wheel remains unchanged, thereby helping to ensure that the vibration patterns (e.g., steering angle changes) applied to the steering wheel as directional cues do not generate yaw moments that actually influence the vehicle's trajectory. This represents an improved technical solution to the technical problem of unintended changes in the vehicle's trajectory caused by the application of steering wheel vibration patterns.

In addition, embodiments of the disclosed technology generate and present directional vehicle steering cues that are capable of conveying not only a directionality of a suggested vehicle maneuver or a safety hazard warning, but also an intensity/speed of the vehicle operator's behavioral response that the cue intends to elicit. For instance, a directional vehicle steering cue that includes applying a vibration pattern to a steering wheel that results in a larger change in steering angle and/or a larger rate of change in steering angle may indicate a suggestion/recommendation to increase the speed and/or intensity with which a corresponding vehicle maneuver is to be performed (e.g., a lane change, a return to a lane of travel after deviating therefrom, a turn, etc.). Thus, in some embodiments, when a faster vehicle maneuver is desired, a first directional vehicle steering cue may be presented that includes applying a first vibration pattern to a steering wheel that involves a relatively large change in steering angle and/or a large rate of change in steering angle. In contrast, if a slower vehicle maneuver is desired, a second directional vehicle steering cue may be presented that includes applying a second vibration pattern to the steering wheel that involves a relatively small change in steering angle and/or a small rate of change in steering angle. This capability to indicate the speed and/or intensity of a suggested vehicle maneuver by, for example, modulating the magnitude of a steering angle change and/or the magnitude of an angular rate of change of the steering angle constitutes a technical improvement over conventional vehicle safety systems. The above-mentioned technical solutions and their resulting technical benefits will now be described in more detail in reference to the Figures and the illustrative embodiments depicted therein.

Referring first to FIG. 1, a vehicle 102 is depicted. The vehicle 102 may be any suitable type of vehicle including, without limitation, automobiles, trucks, motorcycles, recreational vehicles, or other on- or off-road vehicles. In addition, the vehicle 102 may be any of a variety of vehicles that utilize different technologies and/or fuel sources for generating motive force including, but not limited to, hybrid electric vehicles, gasoline-powered vehicles, diesel-powered vehicles, fuel-cell vehicles, electric vehicles, or the like. In some example embodiments, the vehicle 102 may be an autonomous vehicle capable of fully autonomous operation; a semi-autonomous vehicle capable of performing some but not all vehicle operations autonomously; or the like. In those example embodiments in which the vehicle 102 is a fully autonomous vehicle, even though a human driver is not required to operate the vehicle 102, a safety driver may nonetheless be present to comply with governmental regulations, address safety/liability concerns, and potentially take over control of the vehicle in the event of a vehicle system failure or presentation of a directional vehicle steering cue, as described herein.

As depicted in FIG. 1, the vehicle 102 may be traveling along a direction of travel 106. While traveling along the direction of travel 106, the vehicle 102 may, at times, encounter potential safety hazards in the external environment being traversed by the vehicle 102. The potential safety hazards may include other vehicles that are traveling along trajectories that could intersect with a trajectory of the vehicle 102, potentially leading to a collision. The potential safety hazards may further include pedestrians or other objects/obstacles that the vehicle 102 could potentially collide with as it travels along its trajectory. The potential safety hazards 116 may also include infrastructure-related hazards such as hazards present in or around the road infrastructure (e.g., potholes, speed bumps, construction equipment, etc.).

A vehicle operator 104 may be present in the vehicle 102. The vehicle operator 104 may be actively controlling operation of the vehicle 102, or in the case of an autonomous vehicle, may not be actively controlling the vehicle 102 but may be capable of taking over manual control in the event of failure of an autonomous vehicle function, presence of a potential safety hazard, or the like. There may be occasions when a situational awareness of the vehicle operator 104 is diminished due to fatigue, distraction, or the like. A diminished situational awareness of the vehicle operator 104 may prolong the time needed for the operator 104 to perceive and react to potential safety hazards, thereby increasing the safety risk. In some situations, the vehicle operator's 104 diminished situational awareness can lead to failure to follow a navigation route such as by missing turns, making wrong turns, or the like. This, in turn, can lead to delay, frustration, and possibly increased safety risk if, for example, after realizing that she is about to deviate from a planned navigation route, the vehicle operator 104 attempts to make a last-minute vehicle maneuver to remain on the route.

Example embodiments of the disclosed technology provide systems, methods, apparatuses, computer-readable media, techniques, and algorithms for providing directional vehicle steering cues to the vehicle operator 104 to suggest/recommend a particular steering direction (e.g., left vs. right) and/or to provide a directional warning to the operator 104 of an impending hazard. In some embodiments, directional vehicle steering cue logic 118 may be executed to detect occurrence of a triggering event, and responsive to the triggering event, cause one or more vibration patterns to be applied to a steering mechanism 124 (e.g., steering wheel) of the vehicle 102 that convey a directionality associated with an impending hazard or a directionality of a suggested/recommended vehicle maneuver. In some embodiments, upon detecting occurrence of a triggering event, the directional vehicle steering cue logic 118 may be executed to generate and send a control signal 120 to an actuation device 122 which, in turn, may actuate the steering mechanism 124 based on the received control signal 120 to cause a directional vehicle steering cue 126 to be presented to the vehicle operator 104 via the steering mechanism 124. More specifically, in some embodiments, the directional vehicle steering cue logic 118 may detect a triggering event such as the presence of at least a threshold level of safety risk or the satisfaction of triggering criteria for providing a suggested/recommended vehicle maneuver. Upon detecting the triggering event, the directional vehicle steering cue logic 118 may send the control signal 120 to the actuation device 122, which in turn, may present the directional vehicle steering cue 126 to the vehicle operator 104 via the application of one or more vibration patterns to the steering wheel 124.

In some embodiments, the actuation device 122 applies a first vibration pattern to the steering wheel 124 in the form of an applied torque that results in a first change in steering angle in a first direction at a first angular rate of change and a second vibration pattern to the steering wheel 124 in the form of an applied torque that results in a second change in steering angle in a second direction opposing the first direction and at a second angular rate of change. The torques applied for the first and second vibration patterns may be sufficient to change the steering angle, but insufficient to generate yaw moments that modify the vehicle's trajectory. In some embodiments, the magnitude of the change in steering angle may be the same for the first and second vibration patterns, but the first angular rate of change may be larger—potentially substantially larger—than the second angular rate of change. As a result of the significantly faster angular velocity of the first vibration pattern, the vehicle operator 104 may perceive the first vibration pattern but not the second vibration pattern. In this manner, in some embodiments, the application of both the first and second vibration patterns serves as a directional steering cue for the direction in which the first vibration pattern is applied, and at the same time, ensures that the set point of the steering wheel 124 remains unchanged as a result of the average change in steering angle for the combination of the first and second vibration patterns being zero.

Figure 2B:
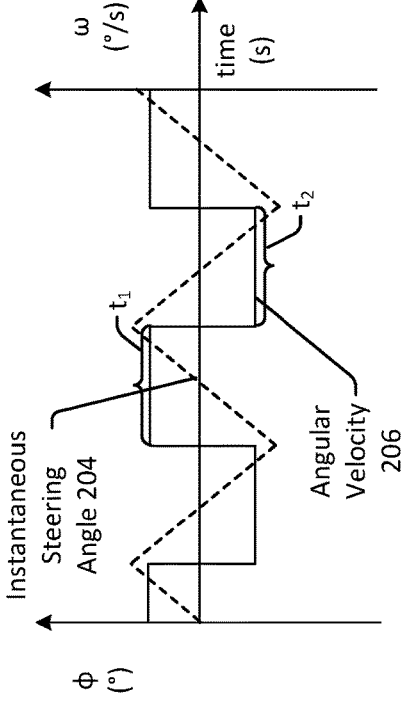
FIG. 2B graphically depicts a symmetric steering vibration pattern that does not convey directionality.
Figure 2C:
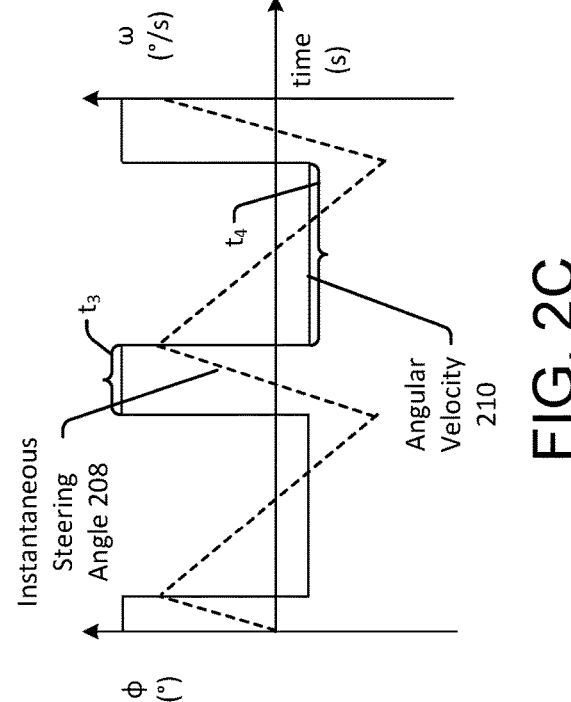
FIG. 2C graphically depicts steering vibration patterns that convey directionality of a warning or directionality of a suggested vehicle maneuver in accordance with example embodiments of the disclosed technology.
Figure 2A:
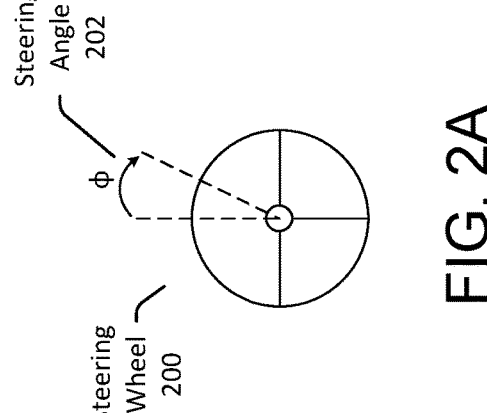
FIG. 2A schematically illustrates a steering angle of a steering wheel in accordance with example embodiments of the disclosed technology.

FIG. 2A schematically illustrates a steering angle 202 (($\rho$)) of a steering wheel 200 in accordance with example embodiments of the disclosed technology. The steering wheel 200 is an example implementation of the steering mechanism 124. For the purposes of establishing a convention, a clockwise rotation of the steering wheel 200 represents a positive steering angle 202 (or a positive change in the steering angle 202) and a counterclockwise rotation of the steering wheel 200 represents a negative steering angle (or a negative change in the steering angle 202).

In some embodiments, a directional vehicle steering cue includes a series of vibration patterns applied to the steering wheel 200 in a manner that conveys directionality. FIG. 2C graphically depicts an example series of steering vibration patterns that convey directionality, which as noted earlier, can be a directionality associated with a warning (e.g., a direction of a potential safety hazard in relation to the vehicle) or a directionality of a suggested vehicle maneuver.

In FIG. 2C, the dashed line represents the instantaneous steering angle 208 over time and the solid line represents the angular velocity 210 over time. It should be appreciated that the angular velocity 210 (i.e., the angular range of change in the steering angle 202 ($\phi$)) is the derivative of the instantaneous steering angle 208 curve. In particular, the angular velocity 210 is given by the slope of the instantaneous steering angle 208 curve. For instance, as depicted in FIG. 2C, the steering angle increases over time period $t_3$. That is, a positive steering angle change (corresponding to a clockwise rotation of the steering wheel 200) occurs over time period $t_3$. The angular velocity 210 over time period $t_3$ is then given by the slope of the steering angle curve 208 over the same time period. Because the steering angle increases linearly over time period $t_3$, the angular velocity 210 over the same period—which is the derivative of the steering angle and given by the slope of the steering angle curve—is constant and positive.

Along similar lines, the steering angle decreases over time period $t_4$. That is, a negative steering angle change (corresponding to a counterclockwise rotation of the steering wheel 200) occurs over time period $t_4$. The angular velocity 210 over time period t4 is then given by the slope of the steering angle curve 208 over the same time period. Because the steering angle decreases linearly over time period $t_4$, the angular velocity 210 over the same period—which is the derivative of the steering angle and given by the slope of the steering angle curve—is constant and negative.

The increase in steering angle over time period $t_3$ is steeper than the decrease in steering angle over time period $t_4$. In particular, as illustrated in FIG. 2C, the slope of the steering angle curve increases more sharply over time period $t_3$ than the slope of the steering angle curve decreases over time period $t_4$. As such, the magnitude of the angular rate of change of the steering angle (the magnitude of the angular velocity 210, i.e., angular speed) over time period $t_3$ is significantly larger than the magnitude of the angular rate of change of the steering angle over time period $t_4$. In some embodiments, the asymmetry that results from the first angular speed of the first steering wheel vibration applied over time period $t_3$ being substantially larger than the second angular speed of the second steering wheel vibration applied over time period $t_4$ conveys a directionality to a vehicle operator with respect to the direction that experiences the steeper angular rate of change (i.e., the direction associated with the first vibration pattern).

More specifically, as previously described, because the first angular speed of the first vibration pattern is substantially larger than the second angular speed of the second vibration pattern, the steering angle change associated with the first vibration pattern may be perceived by a vehicle operator, while the steering angle change associated with the second vibration pattern may not. In this way, the first and second vibration patterns may convey a particular directionality to the vehicle operator.

In some embodiments, the first vibration pattern applied over time period $t_3$ may be thought of as conveying the directionality, while the second vibration pattern may be applied to achieve an average steering angle change of zero over time periods $t_3$ and $t_4$ collectively, and thus, ensure that the steering wheel's 200 initial setpoint remains unchanged. This is illustrated in FIG. 2C by the steering angle returning, at the end of time period $t_4$, to the same angular position as at the beginning of time period $t_3$. Thus, while the magnitude of the steering angle change is the same for each of time periods $t_3$ and $t_4$, the time period $t_4$ is longer than $t_3$, and as such, the magnitude of the angular rate of change in the steering angle (the angular speed) is greater for time period $t_3$ than for time period $t_4$.

The first vibration pattern applied during time period $t_3$ and the second vibration pattern applied during time period $t_4$ may be repeated over multiple time periods—as shown in FIG. 2C—or may occur in a single instance. In some embodiments, in addition to, or in lieu of, treating the steering angle changes over time periods $t_3$ and $t_4$ as independent vibration patterns, the combination of the change in steering angle over time period $t_3$ and the change in steering angle over time period $t_4$, and the repetition of that pattern one or more times, may constitute a single vibration pattern applied to the steering wheel 200.

As previously noted, and as graphically depicted in FIG. 2C, the application of asymmetrical vibration patterns to a steering wheel in accordance with embodiments of the disclosed technology—whereby a first vibration is applied in a first direction at a substantially larger angular rate of change than a second vibration is applied in a second direction—conveys a directionality, in particular, a directionality corresponding to the first direction. It should be appreciated that the first direction may be a left direction (e.g., to suggest a left turn vehicle maneuver) or a right direction (e.g., to suggest a right turn vehicle maneuver). These asymmetrical vibration patterns that convey directionality according to embodiments of the disclosed technology stand in sharp contrast to symmetrical vibration patterns such as those depicted in FIG. 2B.

As shown in FIG. 2B, the steering angle 204 increases over time period $t_1$ at a constant positive angular rate of change and then decreases over time period $t_2$ at a constant negative angular rate of change. In each time period, however, the magnitude of the angular rate of change in the steering angle is the same, that is, the magnitude of the slope of the steering angle curve is the same for time periods $t_1$ and $t_2$. Because the magnitude of the angular velocity 206 (i.e., angular speed) is the same for time period $t_1$ as it is for time period $t_2$, a vehicle operator is not more likely to perceive one vibration pattern (e.g., a change in steering angle over time period $t_1$) over another vibration pattern (e.g., a change in steering angle over time period $t_2$), and thus, the vibration patterns graphically depicted in FIG. 2A do not convey any directionality.

Figure 3:
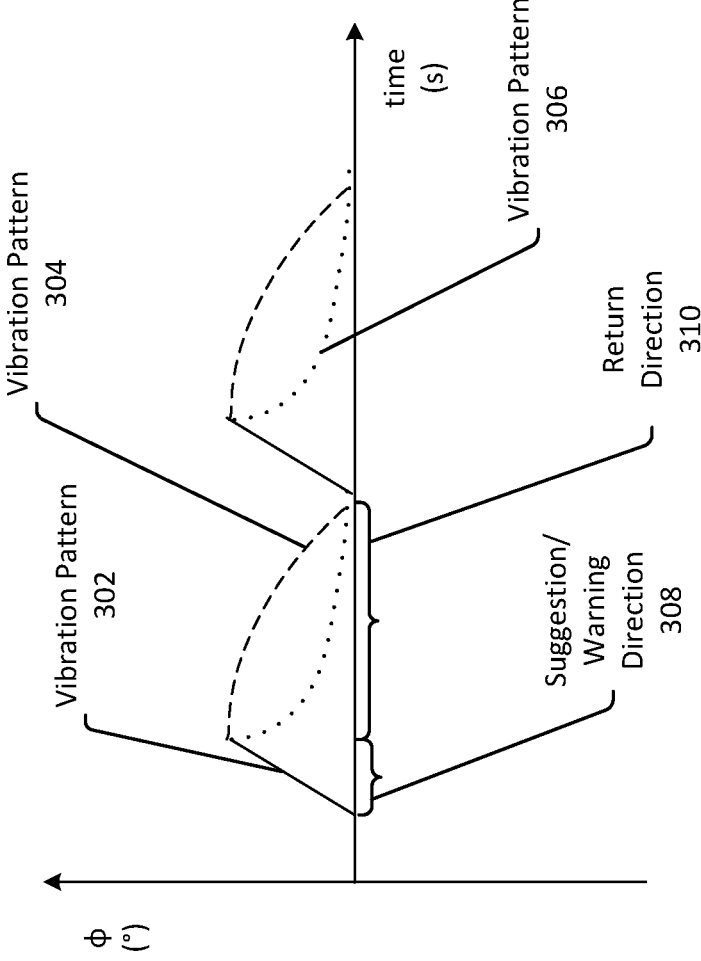
FIG. 3 graphically depicts alternative types of vibration patterns for conveying directionality of a warning or directionality of a suggested vehicle maneuver in accordance with example embodiments of the disclosed technology.

FIG. 3 graphically depicts alternative types of vibration patterns for conveying directionality of a warning or directionality of a suggested vehicle maneuver in accordance with example embodiments of the disclosed technology. In example embodiments, vibration pattern 302 includes a relatively steep change in steering angle in a direction 308. The direction 308 may be a direction in which a vehicle maneuver is recommended to be taken or a direction of a possible safety hazard, such as in the case of a directional warning. The vibration pattern 302 has a constant positive angular rate of change in the steering angle, similar to the vibration pattern observed during time period $t_3$ in FIG. 2C.

In contrast to the vibration patterns of FIG. 2C, however, the vibration pattern in a return direction 310 (i.e., the direction that opposes the direction associated with the warning or suggested vehicle maneuver) may be, in some embodiments, non-linear and may exhibit a non-constant angular rate of change. Example non-linear vibration patterns 304, 306 in the return direction 310 are depicted in FIG. 3. The vibration pattern 304 initially exhibits a relatively flat angular rate of change in steering angle, but then demonstrates an increasing steeper angular velocity. In contrast, vibration pattern 306 initially exhibits a sharp angular rate of change in the steering angle, which then continually becomes less steep over the course of the application of the vibration pattern 306 in the return direction 310. The vibration patterns 304, 306 are applied to the steering wheel over a longer duration of time than the vibration pattern 302, and thus, may be imperceptible to a vehicle operator. In this manner, the vehicle operator may perceive the directionality of the vibration pattern 302, but without causing a net steering angle change, due to one of the imperceptible vibration patterns 304 or 306 being applied in the return direction 310 that opposes the suggestion/warning direction 308.

Referring again to FIG. 1, in example embodiments, the directional vehicle steering cue logic 118 may receive input 116 including sensor data captured by one or more sensors 108, and may determine, based on the received input 116, whether an event has occurred that triggers presentation of the directional vehicle steering cue 126 to the vehicle operator 104. The sensor data may be indicative, at least in part, of sensed characteristics 110 of an external environment in which the vehicle 102 is being operated. Further, in some embodiments, the sensor data may include data received from infrastructure 114 present in the external environment. Such sensor data may be received over one or more communication networks 112 including, for example, one or more wireless communication networks. The sensor data may also include data indicative of vehicle operating parameters such as position/location data; speed/velocity data; acceleration data; braking data; steering data; and so forth.

In example embodiments, one or more sensors 108 located inside the vehicle 102 or provided on an exterior surface of the vehicle 102 may capture data indicative of the sensed characteristics 110. Such sensors 108 may include, without limitation, light detection and ranging (LiDAR) sensors; radars; image sensors (e.g., cameras); motion sensors; microphones; and so forth. Sensors may also be provided to capture data relating to sensed characteristics within an interior cabin of the vehicle 102. Such sensors 108 may include, for example, image sensors, microphones, temperature sensors, and so forth. In addition, sensors 108 may be provided to capture data indicative of operational parameters of the vehicle. Such sensors 108 may include, for example, inertial sensors (e.g., inertial measurements units (IMUS), accelerometers, gyroscopes, etc.) configured to capture acceleration, velocity/speed, and orientation data; temperature sensors; vibration sensors; sensors configured to capture data relating to the operation of electrical (e.g., battery) and/or mechanical (e.g., powertrain) components of the vehicle; and so forth. Moreover, in some example embodiments, one or more sensors provided as part of the external environment infrastructure 114 and/or one or more sensors associated with other vehicles, pedestrians, or the like within the environment may capture and communicate sensor data to the vehicle 102 via wireless communication network(s) 112.

In example embodiments, the sensors 108 described above may be configured to continuously monitor and capture data relating to an environment, operational parameter, or the like. In some embodiments, a sensor may periodically capture data according to a predetermined schedule (e.g., a sampling rate, a scanning rate of a LiDAR, etc.). In some embodiments, the sensor data may include image data of an environment surrounding the vehicle 102. The image data of the vehicle's external environment may be captured at a selected frame rate by a collection of cameras. The cameras may be disposed such that different cameras capture image data of different portions of the external environment. In example embodiments, the sensor data reflective of the sensed characteristics 110 within the vehicle's external environment may further include three-dimensional (3D) point cloud data captured by a LiDAR, radar data, and the like.

In some embodiments, the sensor data may be analyzed to evaluate a level of safety risk posed by the sensed external environment characteristics. For instance, machine learning-based object perception processing may be executed on image data to identify and classify objects present in the vehicle's external environment. As another non-limiting example, LiDAR and/or radar data may be analyzed to determine relative distances between the vehicle and other objects in the external environment; speed, acceleration, etc. of moving objects in the environment with respect to each other and with respect to the vehicle; and so forth.

In some embodiments, the directional vehicle steering cue logic 118 may be configured to execute an algorithm (e.g., a machine learning algorithm) that receives at least a portion of the captured sensor data as input 116, quantifies the safety risk level based on the received input 116, and determines whether the safety risk level exceeds a threshold level for triggering presentation of the directional vehicle steering cue 126 to the vehicle operator 104. In other example embodiments, the directional vehicle steering cue logic 118 may evaluate the sensor data received as input 116 to determine whether various triggering criteria are met for presenting the directional vehicle steering cue 126 to the vehicle operator 104 to suggest a vehicle maneuver to maintain a trajectory of the vehicle 102 on a predefined navigation route. It should be appreciated that the above-described examples of sensor data that may be captured and analyzed are illustrative and not exhaustive.

Figure 4:
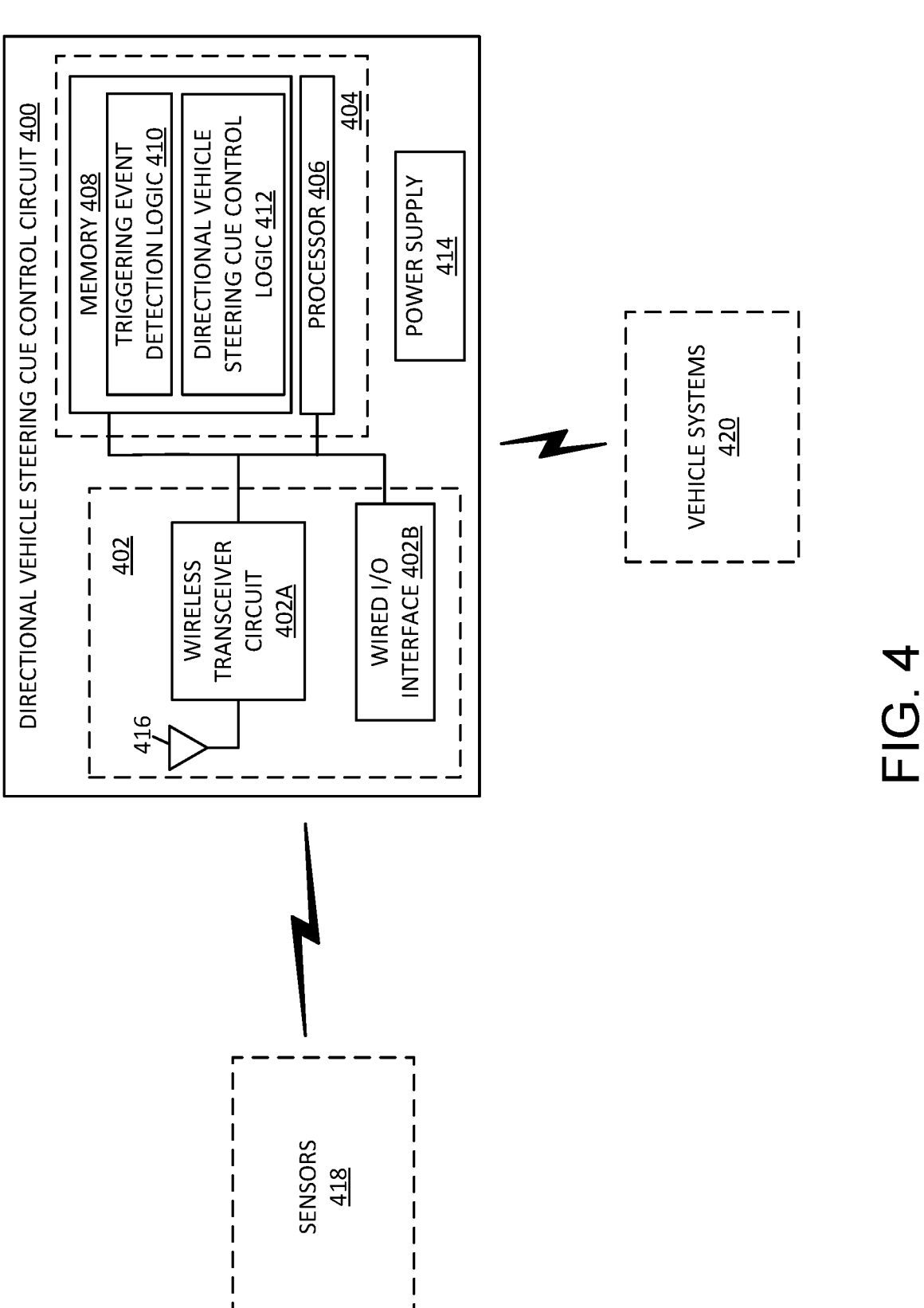
FIG. 4 illustrates an example circuit architecture that includes example logic for triggering the presentation of directional vehicle steering cues to a vehicle operator in accordance with example embodiments of the disclosed technology.

In example embodiments, the directional vehicle steering cue logic 118 may be implemented within a vehicle control circuit such as that depicted in FIG. 4. Referring now to FIG. 4, an example implementation of a directional vehicle steering cue control circuit 400 is depicted. The control circuit 400 includes a communication circuit 402, a decision circuit 404 (including a processor 406 and a memory 408) and a power supply 414. While components of the control circuit 400 are illustrated as communicating with each other via a data bus, other communication interfaces are also contemplated. Although not depicted in FIG. 4, the control circuit 400 may include a switch (physical or virtual) that allows a user to toggle the functionality of the control circuit 400 on and off.

In some embodiments, the processor 406 accesses the memory 408 and executes machine-executable instructions stored therein. More specifically, the processor 406 may execute machine-executable instructions contained in triggering event detection logic 410 as well as machine-executable instructions contained in directional vehicle steering cue control logic 412. In some embodiments, the logic 410 and the logic 412 may be, for example, sub-modules of the directional vehicle steering cue logic 118. The control circuit 400 may be provided in the vehicle 102, for example, and can be implemented as part of an electronic control unit (ECU) of the vehicle 102 or as a standalone component. The example control circuit 400 may be implemented in connection with any of the types of vehicles previously described in reference to the vehicle 102.

In example embodiments, the processor 406 executes the triggering event detection logic 410 to cause the control circuit 400 to gather and assess sensor data to determine whether a triggering event has occurred. In some embodiments, the processor 406 is configured to execute the triggering event detection logic 410 to detect a triggering event based on an evaluation of whether one or more triggering criteria are satisfied. In some embodiments, the triggering criteria may relate to whether an object in the vehicle's 102 environment poses at least a threshold safety risk to the vehicle 102 and/or the vehicle operator 104. In other embodiments, the triggering criteria may relate to whether there is at least a threshold likelihood that the vehicle 102 will deviate from a predefined navigation route being traversed by the vehicle 102 due to the vehicle operator 104 failing to make a particular vehicle maneuver, for example.

In example embodiments, the processor 406 may execute the triggering event detection logic 410 to determine various information/metrics from the sensed external environment characteristics 110. If, for example, the triggering event detection logic 410 seeks to determine whether an object in the vehicle's external environment poses at least a threshold safety risk, the information/metrics derived from the sensor data may include, without limitation, a current/future location of the vehicle 102; a current/future location of an object in the vehicle's 102 external environment; a relative distance between the vehicle 102 and the object; a current and/or future trajectory of the vehicle 102; a current and/or future trajectory of the object; a size of the object; velocity/acceleration of the vehicle 102 and/or the object; and so forth. If, for example, the triggering event detection logic 410 seeks to determine whether there is at least a threshold likelihood that the vehicle 102 will deviate from a predetermined navigation route, the information/metrics derived from the sensor data may include, without limitation, a current and/or future location of the vehicle 102; a distance of the vehicle 102 from a location on the route at which a particular vehicle maneuver is expected (e.g., a turning maneuver) to maintain the vehicle 102 on the route; a velocity/acceleration of the vehicle; a steering angle; an angular velocity of the steering angle; and so forth.

In some embodiments, the triggering event detection logic 410 is executed to evaluate each of multiple information types/metrics with respect to corresponding triggering criteria to determine whether a triggering event has occurred for presenting the directional vehicle steering cue 126. Non-limiting examples of triggering criteria that the triggering event detection logic 410 may evaluate in connection with directional warning embodiments of the disclosed technology include whether a relative distance between the vehicle 102 and an object is less than a threshold distance; whether a relative, individual, and/or combined velocity and/or acceleration of the vehicle 102 or the object exceed one or more threshold values; the extent to which respective future trajectories of the vehicle and the object will deviate or intersect; and so forth. Non-limiting examples of triggering criteria that the triggering event detection logic 410 may evaluate in connection with suggested vehicle maneuver embodiments of the disclosed technology include whether the vehicle 102 will reach, within a threshold amount of time, a particular location along a predetermined navigation route at which a turning maneuver will be required to remain on the route; whether criteria for establishing that the turning maneuver has been initiated are met including, for example, whether the vehicle 102 has experienced at least a threshold amount of deceleration over a preceding time window and/or whether a steering angle of the vehicle 102 has changed in the direction of the turning maneuver by at least a threshold amount; whether the amount of time for the vehicle 102 to reach the location of the turning maneuver is above a minimum amount of time needed to safely present the directional vehicle steering cue and have the vehicle operator 104 respond with the turning maneuver; and so forth.

In some embodiments, the triggering event detection logic 410 detects a triggering event if at least a threshold number of triggering criteria are satisfied. In other embodiments, the triggering event detection logic 410 may weight individual triggering criterion to generate a score. The score may, for example, quantify a level of safety risk posed by an object (e.g., another vehicle, a pedestrian, etc.) in the vehicle's 102 environment. As another non-limiting example, the score may represent a likelihood that the vehicle 102 will fail to make a turning maneuver to remain along a predetermined navigation route. In example embodiments, the score generated by assigning individual weights to different triggering criterion may be compared to a threshold value to determine whether a triggering event has occurred to trigger presentation of the directional vehicle steering cue 126.

If the triggering event detection logic 410 detects that triggering criteria are satisfied so as to constitute a triggering event, the processor 406 may execute machine-executable instructions of the directional vehicle steering cue control logic 412 to initiate presentation of the directional vehicle steering cue 126 via the steering mechanism 124. More specifically, in some embodiments, the directional vehicle steering cue control logic 412 may be executed to cause one or more vibration patterns—such as those described in reference to FIG. 2C or FIG. 3—to be applied to a steering wheel of the vehicle 102. As previously described, the vibration pattern(s) may include change(s) in the steering angle of the steering wheel of the vehicle 102 at one or more angular rates of change that indicate a directionality to the vehicle operator 104 (e.g., a directionality of a potential safety hazard in the vehicle's 102 external environment or a directionality of a suggested vehicle maneuver).

For example, the processor 406 may execute the directional vehicle steering cue control logic 412 to cause a first vibration pattern to be applied to a steering wheel of the vehicle 102 by rotating the steering wheel in a first direction at a first angular rate of change, followed by a second vibration pattern according to which the steering wheel is rotated at a second angular rate of change in a second direction opposing the first direction. In some embodiments, the first angular rate of change may be substantially larger than the second angular rate of change so as to convey a directionality (the first direction in this example) of a suggested turning maneuver or of an environmental safety hazard.

In some embodiments, the directional vehicle steering cue control logic 412 may be configured to modulate a magnitude of the angular rate of change in steering angle associated with a vibration pattern to indicate a desired intensity or speed of a corresponding vehicle maneuver sought to be elicited by the vibration pattern. For instance, the directional vehicle steering cue control logic 412 may be configured to increase the angular velocity of a steering wheel vibration pattern to cue the vehicle operator 104 that a faster turning maneuver is required, and thus, that the vehicle operator 104 needs to apply more torque to the steering wheel and/or apply the torque more quickly in order to perform the desired turning maneuver effectively. In some embodiments, triggering events that indicate a heightened urgency for a desired vehicle maneuver (e.g., an urgent turning maneuver that needs to be made to stay on a specified navigation route) or an otherwise heightened level of risk may trigger the directional vehicle steering cue control logic 412 to cause directional steering cues to be presented that include vibration patterns having a greater intensity (e.g., involving larger angular rates of change in the steering angle). The vehicle operator 104 may thus be informed of the urgency of the recommended vehicle maneuver or the urgency of the vehicle safety risk based on the intensity of the vibration pattern(s) applied to the steering wheel.

Further, in some embodiments, the directional vehicle steering cue control logic 412 is configured to modify a directional steering cue based on data indicative of a behavioral response of the vehicle operator 104 to the directional steering cue. For example, in some embodiments, the control logic 412 modifies an intensity (e.g., a magnitude of an angular velocity of the steering angle) of a vibration pattern applied to the steering wheel based on a reaction time of the vehicle operator 104, where the reaction time may be an amount of time that elapses between when the cue is initiated and when the vehicle operator 104 applies a torque to the steering wheel that is responsive to the cue. As another non-limiting example, in some embodiments, the control logic 412 modifies an intensity of a steering wheel vibration pattern based the amount of torque applied by the vehicle operator 104 in response to the cue. It should be appreciated that the above examples of modulating the vibration pattern(s) of a directional vehicle steering cue are illustrative and not exhaustive.

Referring now to illustrative components on the control circuit 400 in more detail, processor 406 can include a graphical processing unit (GPU), a central processing unit (CPU), a microprocessor, or any other suitable processing unit or system. The memory 408 may include one or more various forms of memory or data storage (e.g., flash memory, random access memory (RAM), etc.). Memory 408, can be made up of one or more modules of one or more different types of memory, and may be configured to store data and other information as well as operational instructions that may be used by the processor 406 to implement functionality of the control circuit 400. For example, the memory 408 may store the triggering event detection logic 410 and the directional vehicle steering cue control logic 412.

Although the control circuit 400 is illustrated using processor and memory circuitry, as described below with reference to circuits disclosed herein, decision circuit 404 can be implemented utilizing any form of circuitry including, for example, hardware, software, firmware, or any combination thereof. By way of further example, one or more processors; controllers; application specific integrated circuits (ASICs); programmable logic array (PLAs) devices; programmable array logic (PAL) devices; complex programmable logic devices (CPLDs); field programmable gate arrays (FPGAs); logical components; software routines; or other mechanisms might be implemented to make up the control circuit 400. Similarly, in some example embodiments, the logic 410 and/or the logic 412 can be implemented in any combination of software, hardware, or firmware.

Communication circuit 402 may include a wireless transceiver circuit 402A with an associated antenna 416 and/or a wired input/output (I/O) interface 402B with an associated hardwired data port (not illustrated). As this example illustrates, communications with the control circuit 400 can include wired and/or wireless communications. Wireless transceiver circuit 402A can include a transmitter and a receiver (not shown) to allow wireless communications via any of a number of communication protocols such as, for example, an 802.11 wireless communication protocol (e.g., WiFi), Bluetooth, near field communications (NFC), Zigbee, or any of a number of other wireless communication protocols whether standardized, proprietary, open, point-to-point, networked or otherwise. Antenna 416 is coupled to wireless transceiver circuit 402A and is used by wireless transceiver circuit 402A to transmit radio frequency (RF) signals wirelessly to wireless equipment with which it is connected and to receive radio signals as well. These RF signals can include information of almost any sort that is sent or received by the control circuit 400 to/from other entities such as vehicle sensors 418, other vehicle systems 420, or the like.

The control circuit 400 may be communicatively coupled to a plurality of sensors 418. The sensors 418 may be configured to detect various conditions internal and/or external to a vehicle (e.g., the vehicle 102) and provide sensor data indicative of the sensed conditions to, for example, the control circuit 400. The sensors 418 may include the sensors 108 and any of the types of sensors described herein. In example embodiments, the sensors 418 may be configured to detect and measure one or more operational parameters of a vehicle such as, for example, fuel efficiency, motor efficiency, hybrid efficiency, acceleration, etc. In some embodiments, one or more of the sensors 418 may include their own processing capability to compute the results for additional information that can be provided to, for example, an ECU of the control circuit 400. In other example embodiments, one or more of the sensors 418 may be data gathering-only sensors that provide only raw data. In further example embodiments, the sensors 418 may include hybrid sensors that provide a combination of raw data and processed data. The sensors 418 may provide an analog output or a digital output.

As previously noted, one or more of the sensors 418 may be able to detect conditions that are external to a vehicle. Sensors that might be used to detect characteristics within an external vehicle environment can include, for example, sonar, radar, LiDAR or other vehicle proximity sensors; cameras or other image sensors; global positioning system (GPS) devices; and so forth. Image sensors can be used to capture images of the external environment and object perception processing may be executed on the image data to detect and classify/identify objects present in the external environment. While some sensors can be used to actively detect passive environmental objects (static or dynamic), other sensors can be included and used to detect active objects such as those objects used to implement smart roadways, which may actively transmit and/or receive data or other information. Such active objects may constitute at least part of the external environment infrastructure 114 depicted in FIG. 1.

Referring again to components of the control circuit 400 in more detail, wired I/O interface 402B can include a transmitter and a receiver (not shown) for hardwired communications with other devices. For example, wired I/O interface 402B can provide a hardwired interface to other components, including one or more of the vehicle sensors 418 or other vehicle systems 420. Wired I/O interface 402B can communicate with other devices using Ethernet or any of a number of other wired communication protocols whether standardized, proprietary, open, point-to-point, networked or otherwise.

Vehicle systems 420 can include any of a number of different vehicle components or subsystems used to control or monitor various aspects of a vehicle and its performance. For instance, the vehicle systems 420 include a GPS or other vehicle positioning system; torque splitters that can control distribution of power among the vehicle wheels such as, for example, by controlling front/rear and left/right torque split; engine control circuits to control the operation of an engine; cooling systems to provide cooling for a motor, power electronics, the engine, or other vehicle systems; a suspension system such as, for example, an adjustable-height air suspension system, steering control systems; and other vehicle systems.

Power supply 414 can include one or more batteries of one or more types including, without limitation, Li-ion, Li-Polymer, NiMH, NiCd, NiZn, $NiH_2$, etc. (whether rechargeable or primary batteries); a power connector (e.g., to connect to vehicle supplied power); an energy harvester (e.g., solar cells, a piezoelectric system, etc.); or any other suitable power supply.

It should be appreciated that the logic 410 and/or the logic 412 may be partitioned into two or more engines, program modules, or the like (referred to generically at times hereinafter simply as program module or module). A program module may be a standalone module or a sub-module of another module. Moreover, each module may be implemented in software as computer/machine-executable instructions or code; in firmware; in hardware as hardwired logic within a specialized computing circuit such as an ASIC, FPGA, or the like; or as any combination thereof. It should be understood that any description herein of a module or a circuit performing a particular task or set of tasks encompasses the task(s) being performed responsive to execution of machine-executable instructions of the module and/or execution of hardwired logic of the module.

Example methods according to embodiments of the disclosed technology, which are depicted in the flowcharts of FIGS. 5 and 6, will now be described in reference to the control circuit 400 of FIG. 4. Referring first to the example method 500 of FIG. 5, at block 502 of the method 500, the control circuit 400 may collect vehicle operational data, vehicle navigation data, and/or data relating to a vehicle's external environment. More specifically, the control circuit 400 may receive sensor data from the sensors 418, which may include, for example, data indicative of sensed characteristics of the vehicle's external environment such as data captured by a LiDAR sensor, a radar, an image sensor, a motion sensor, a microphone, or the like. The sensor data collected/received at block 502 may further include data relating to sensed characteristics within an interior cabin of the vehicle such as data captured by cameras, microphones, temperature sensors, etc. located within the vehicle. In some embodiments, the sensor data received by the control circuit at block 502 includes data indicative of operational parameters of the vehicle such as data captured by inertial sensors including, but not limited to, acceleration, velocity/speed, and orientation data; temperature data; vibration data; data relating to the operation of electrical and/or mechanical components of the vehicle; and so forth. Further, in some embodiments, the data received by the control circuit 400 at block 502 includes vehicle navigation data such as data indicative of a predefined navigation route, GPS coordinate data, map data, and the like.

At block 504 of the method 500, the processor 406 of the control circuit 400 may execute machine-executable instructions of the triggering event detection logic 410 to determine, based at least in part on the data collected/received at block 502, that triggering criteria for providing a directional vehicle steering cue to a vehicle operator are met. The triggering criteria evaluated at block 504 may include any of the example types of criteria previously described including criteria related to determining whether an object or event in a vehicle's external environment poses at least a threshold safety risk and/or criteria related to determining whether there is at least a threshold likelihood that the vehicle deviates from a predefined navigation route such as a threshold likelihood that the vehicle will miss an upcoming turn.

In some embodiments, each triggering criterion that is evaluated may be assigned a corresponding value. The set of values assigned to the set of triggering criteria may then be aggregated or otherwise manipulated to generate one or more trigger scores, which may then be compared to one or more threshold values to determine whether conditions are present that rise to the level of a triggering event for a directional vehicle steering cue. In some embodiments, mere satisfaction of some threshold number of triggering criteria may constitute a triggering event.

In some embodiments, the value assigned to a triggering criterion depends on whether the criterion is satisfied. For instance, a triggering criterion for a suggested vehicle maneuver directional steering cue may be deemed satisfied if a vehicle is expected to reach, within a threshold amount of time, a location at which a turning maneuver is required to remain on a predetermined navigation route. In this case, a positive value may be assigned to the triggering criterion. If, on the other hand, the vehicle is not expected to reach the location within the threshold amount of time, the triggering criterion may be deemed not satisfied, and a negative value may be assigned to the triggering criterion.

In some embodiments, different triggering criterion may be weighted differently. For instance, a vehicle's speed may be more closely correlated to serious injury in the event of a collision with an object as compared to the size of the object. In such an example, a triggering criterion relating to the vehicle's speed (e.g., whether the vehicle's velocity/speed exceeds a threshold value) may be weighted more than a triggering criterion relating to the size of the object that presents the potential safety hazard (e.g., whether dimensions of the object exceed threshold dimensions).

At block 506 of the method 500, upon receiving an indication that a triggering event has been detected, the processor 406 may execute machine-executable instructions of the directional vehicle steering cue control logic 412 to generate and send a control signal to an actuation device to cause a directional vehicle steering cue to be applied to a steering mechanism of a vehicle. Referring to the example scenario depicted in FIG. 1, the processor 406 may execute the control logic 412 to send the control signal 120 to the actuation device 122 (e.g., steering column) to cause a first vibration pattern to be applied to a steering wheel of the vehicle 102. The first vibration pattern may include a first torque applied to the steering wheel in a first direction at a first angular rate of change.

Then, at block 508 of the method 500, the processor 406 may execute machine-executable instructions of the directional vehicle steering cue control logic 412 to generate and send a control signal to the actuation device 122 to cause a second vibration pattern to be applied to the steering wheel of the vehicle 102. The second vibration pattern may include a second torque applied to the steering wheel in a second direction that opposes the first direction and at a second angular rate of change different from the first angular rate of change.

In some embodiments, the first angular rate of change may be similar to the relatively sleep change in steering angle that occurs during time period $t_3$ (FIG. 2C), while the second angular rate of change may be similar to the less steep change in steering angle that occurs during time period $t_4$. As such, a vehicle operator may perceive the first angular rate of change and not perceive the second angular rate of change (or at least the first angular rate of change may be substantially more perceptible than the second angular rate of change), and in this manner, a directionality associated with the first angular rate of change (i.e., the first direction) may be conveyed to the vehicle operator. As previously described, this directionality may represent the direction of a potential safety hazard in relation to the vehicle 102 (e.g., an object in the vehicle's 102 external environment) or a suggested/recommended direction of a vehicle maneuver sought to be elicited by the directional vehicle steering cue. In some embodiments, the second vibration pattern is applied to ensure that a net steering angle change across multiple directional cues is zero. In some embodiments, repetitive application of the first and second vibration patterns in sequence may, in the aggregate, constitute the directional cue.

The example method 600 depicted in the flowchart of FIG. 6 will now be described in reference to the control circuit 400 depicted in FIG. 4. At block 602 of the method 600, the control circuit 400 may detect occurrence of a triggering event for a direction vehicle steering cue. More specifically, the processor 406 may execute machine-executable instructions of the triggering event detection logic 410 to detect occurrence of a triggering event that triggers presentation of a directional vehicle steering cue to a vehicle operator. In some embodiments, a triggering event is detected if evaluation of a set of triggering criteria indicates at least a threshold level of safety risk or at least a threshold likelihood that the vehicle will deviate from a predefined navigation route. Any of the types of triggering criteria and any of the approaches/algorithms for evaluating such criteria to ascertain whether a triggering event has occurred described above can be employed.

At block 604 of the method 600, the processor 406 may execute machine-executable instructions of the directional vehicle steering cue control logic 412 to cause a vibration pattern to be applied to a steering wheel of a vehicle in a first direction at a first angular rate of change. The vibration pattern may constitute a directional warning to the vehicle operator of a potential safety hazard in the first direction or a suggestion to the vehicle operator to initiate a vehicle maneuver in the first direction. It should be appreciated that additional vibration patterns may be applied to the steering wheel as part of the directional steering cue. For instance, a second vibration pattern that returns the steering angle to its original position may be applied. More specifically, in some embodiments, the second vibration pattern may be applied in an opposing direction, over a longer period of time, and with a substantially smaller angular rate of change in the steering angle as compared to the initial vibration pattern so as not to affect the directionality indicated by application of the initial vibration pattern.

At block 606 of the method 600, the control circuit 400 may collect data indicative of a behavioral response of the vehicle operator to the directional vehicle steering cue. The data may include, without limitation, a reaction time of the vehicle operator to the directional vehicle steering cue, an amount of torque applied by the vehicle operator in response to the cue, a braking force applied by the vehicle operator, and so forth.

Then, at block 608 of the method 600, the processor 406 may execute machine-executable instructions of the directional vehicle steering cue control logic 412 to modify the applied vibration pattern based at least in part on the collected data indicative of the behavioral response of the vehicle operator to the directional steering cue. Modifying the applied vibration pattern may include, without limitation, increasing a magnitude of the angular rate of change in the steering angle if the behavioral response data indicates an insufficient response from the vehicle operator to the directional steering cue or decreasing a magnitude of the angular rate of change in the steering angle if the behavioral response data indicates an adequate response from the vehicle operator. In some embodiments, modifying the applied vibration pattern may include reversing a direction of the vibration pattern to, for example, guide the vehicle operator to reduce and/or change the direction of the torque that the vehicle operator applies in response to the directional steering cue. It should be appreciated that the above examples of behavioral response data for the vehicle operator and the types of adjustments that can be made to the vibration pattern(s) of a directional steering cue based on such data are illustrative and not exhaustive.

As used herein, the terms circuit and component might describe a given unit of functionality that can be performed in accordance with one or more embodiments of the disclosed technology. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 6. Various embodiments are described in terms of this example-computing component 700. After reading this description, it will become apparent to a person skilled in the relevant art how to implement the application using other computing components or architectures.

Referring now to FIG. 7, computing component 700 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 700 might also represent computing capabilities embedded within or otherwise available to a given device. For example, a computing component might be found in other electronic devices such as, for example, portable computing devices, and other electronic devices that might include some form of processing capability.

Computing component 700 might include, for example, one or more processors, controllers, control components, or other processing devices. This can include a processor 704, the processor 406 (FIG. 4), or the like. Processor 704 might be implemented using a general-purpose or special-purpose processing engine such as, for example, a microprocessor, controller, or other control logic. Processor 704 may be connected to a bus 702. However, any communication medium can be used to facilitate interaction with other components of computing component 700 or to communicate externally.

Computing component 700 might also include one or more memory components, simply referred to herein as main memory 706, which may, in example embodiments, include the memory 408 (FIG. 4). For example, random access memory (RAM) or other dynamic memory, might be used for storing information and instructions to be executed by processor 704. Main memory 706 might also be used for storing temporary variables or other intermediate information during execution of instructions to be executed by processor 704. Computing component 700 might likewise include a read only memory ("ROM") or other static storage device coupled to bus 702 for storing static information and instructions for processor 704.

The computing component 700 might also include one or more various forms of information storage 708, which might include, for example, a media drive 710 and a storage unit interface 714. The media drive 710 might include a drive or other mechanism to support fixed or removable storage media 712. For example, a hard disk drive, a solid-state drive, a magnetic tape drive, an optical drive, a compact disc (CD) or digital video disc (DVD) drive (R or RW), or other removable or fixed media drive might be provided. Storage media 712 might include, for example, a hard disk, an integrated circuit assembly, magnetic tape, cartridge, optical disk, a CD or DVD. Storage media 712 may be any other fixed or removable medium that is read by, written to or accessed by media drive 710. As these examples illustrate, the storage media 712 can include a computer usable storage medium having stored therein computer software or data.

In alternative embodiments, information storage mechanism 708 might include other similar instrumentalities for allowing computer programs or other instructions or data to be loaded into computing component 700. Such instrumentalities might include, for example, a fixed or removable storage unit 716 and an interface 714. Examples of such storage units 716 and interfaces 714 can include a program cartridge and cartridge interface, a removable memory (for example, a flash memory or other removable memory component) and memory slot. Other examples may include a PCMCIA slot and card, and other fixed or removable storage units 716 and interfaces 714 that allow software and data to be transferred from storage unit 716 to computing component 700.

Computing component 700 might also include a communications interface 718. Communications interface 718 might be used to allow software and data to be transferred between computing component 700 and external devices. Examples of communications interface 718 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 718 may be carried on signals, which can be electronic, electromagnetic (which includes optical) or other signals capable of being exchanged by a given communications interface 718. These signals might be provided to communications interface 718 via a channel 720. Channel 720 might carry signals and might be implemented using a wired or wireless communication medium. Some examples of a channel 720 might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 706, storage unit 716, media 712, and channel 720. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 700 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A vehicle system, comprising:

a user interface;

a steering mechanism; and a vehicle control circuit comprising:

at least one memory storing machine-executable instructions; and at least one processor configured to access the at least one memory and execute the machine-executable instructions to:

provide, via the user interface, an option to select between a directional steering cue warning mode and a directional steering cue suggestion mode;

detect occurrence of a triggering event for a directional vehicle steering cue, wherein detecting the occurrence of the triggering event comprises detecting that a vehicle is within a threshold distance of a potential hazard; and present the directional vehicle steering cue to a vehicle operator, wherein presenting the directional vehicle steering cue comprises:

responsive to selection of the directional steering cue warning mode, applying a first steering torque to the steering mechanism resulting in a change to a steering angle of the steering mechanism in a first direction corresponding to a direction of the potential hazard, and responsive to selection of the directional steering cue suggestion mode, applying a second steering torque to the steering mechanism resulting in a change to the steering angle of the steering mechanism in a second direction to avoid the potential hazard, wherein the first direction is opposite the second direction.

2. The vehicle system of claim 1, wherein:

presenting the directional vehicle steering cue responsive to the selection of the directional steering cue warning mode further comprises applying a third steering torque to the steering mechanism resulting in a change to the steering angle of the steering mechanism in the second direction opposing the first direction;

the first steering torque resulting in the change to the steering angle of the steering mechanism in the first direction is applied at a first angular rate of change;

the third steering torque resulting in the change to the steering angle of the steering mechanism in the second direction is applied at a second angular rate of change different than the first angular rate of change; and the first steering torque is applied over a first time period and the third steering torque is applied over a second time period, the first time period having a shorter duration than the second time period.

3. The vehicle system of claim 2, wherein the second time period is subsequent to the first time period.

4. The vehicle system of claim 2, wherein the first angular rate of change is greater than the second angular rate of change.

5. The vehicle system of claim 2, wherein at least one of the first angular rate of change or the second angular rate of change is not constant.

6. The vehicle system of claim 2, wherein the first steering torque is one of a plurality of steering torques applied in the first direction and the third steering torque is one of a plurality of steering torques applied in the second direction, and wherein an average change in steering angle of the plurality of steering torques in the first direction and the plurality of steering torques in the second direction is zero.

7. The vehicle system of claim 1, wherein the application of the first steering torque to the steering mechanism is prevented upon a determination that a speed of travel of the vehicle in combination with initiation of a maneuver responsive to the first steering torque would result in a safety risk.

8. The vehicle system of claim 1, wherein the directional vehicle steering cue is a first directional vehicle steering cue and the triggering event is a first triggering event, and wherein the at least one processor is further configured to execute the machine-executable instructions to:

collect data indicative of a behavioral response of the vehicle operator to the first directional vehicle steering cue; and modify a magnitude of at least one of the first steering torque and the second steering torque based on the behavioral response of the vehicle operator to the first directional vehicle steering cue.

9. A method, comprising:

providing, via a user interface of a vehicle, an option to select between a directional steering cue warning mode and a directional steering cue suggestion mode;

detecting occurrence of a triggering event for a directional vehicle steering cue, wherein detecting the occurrence of the triggering event comprises detecting that the vehicle is within a threshold distance of a potential hazard; and presenting the directional vehicle steering cue to an operator of the vehicle, wherein presenting the directional vehicle steering cue comprises:

responsive to selection of the directional steering cue warning mode, applying a first steering torque to the steering mechanism resulting in a change to a steering angle of the steering mechanism in a first direction corresponding to a direction of the potential hazard, and responsive to selection of the directional steering cue suggestion mode, applying a second steering torque to the steering mechanism resulting in a change to the steering angle of the steering mechanism in a second direction to avoid the potential hazard, wherein the first direction is opposite the second direction.

10. The method of claim 9, further comprising preventing the application of the first steering torque to the steering mechanism upon a determination that a speed of travel of the vehicle in combination with initiation of a maneuver responsive to the first steering torque would result in a safety risk.

11. A vehicle control circuit, comprising:

at least one memory storing machine-executable instructions; and at least one processor configured to access the at least one memory and execute the machine-executable instructions to:

provide, via the user interface, an option to select between a directional steering cue warning mode and a directional steering cue suggestion mode;

determine that triggering criteria are met for applying a directional vehicle steering cue to a steering mechanism of a vehicle, wherein determining that the triggering criteria are met comprises determining that the vehicle is within a threshold distance of a safety hazard; and present the directional vehicle steering cue to a vehicle operator, wherein presenting the directional vehicle steering cue comprises:

responsive to selection of the directional steering cue warning mode, applying a first steering torque to the steering mechanism resulting in a change to a steering angle of the steering mechanism in a first direction corresponding to a direction of the safety hazard, and responsive to selection of the directional steering cue suggestion mode, applying a second steering torque to the steering mechanism resulting in a change to the steering angle of the steering mechanism in a second direction to avoid the potential hazard, wherein the first direction is opposite the second direction.

12. The vehicle control circuit of claim 11, wherein the directional vehicle steering cue is a first directional vehicle steering cue and the triggering event is a first triggering event, and wherein the at least one processor is further configured to execute the machine-executable instructions to:

collect data indicative of a behavioral response of the vehicle operator to the first directional vehicle steering cue; and modify a magnitude of at least one of the first steering torque and the second steering torque based on the behavioral response of the vehicle operator to the first directional vehicle steering cue.

13. The vehicle control circuit of claim 11, wherein:

presenting the directional vehicle steering cue responsive to the selection of the directional steering cue warning mode further comprises applying a third steering torque to the steering mechanism resulting in a change to the steering angle of the steering mechanism in the second direction opposing the first direction;

the first steering torque resulting in the change to the steering angle of the steering mechanism in the first direction is applied at a first angular rate of change;

the third steering torque resulting in the change to the steering angle of the steering mechanism in the second direction is applied at a second angular rate of change different than the first angular rate of change; and the first steering torque is applied over a first time period and the third steering torque is applied over a second time period, the first time period having a shorter duration than the second time period.

14. The vehicle control circuit of claim 13, wherein the second time period is subsequent to the first time period.

15. The vehicle control circuit of claim 13, wherein the first angular rate of change is greater than the second angular rate of change.

16. The vehicle control circuit of claim 13, wherein at least one of the first angular rate of change or the second angular rate of change is not constant.

17. The vehicle control circuit of claim 13, wherein the first steering torque is one of a plurality of steering torques applied in the first direction and the third steering torque is one of a plurality of steering torques applied in the second direction, and wherein an average change in steering angle of the plurality of steering torques in the first direction and the plurality of steering torques in the second direction is zero.

* * * * *